United States Patent

[11] 3,572,953

[72] Inventor Hans Beutelspacher
 Braunschweig, Germany
[21] Appl. No. 855,823
[22] Filed Sept. 8, 1969
[45] Patented Mar. 30, 1971
[73] Assignee Heraeus-Christ GmbH Gepsmuhlenweg
 Osterode Harz, Germany
[32] Priority Sept. 23, 1968
[33] Germany
[31] P 17 98 300.5

[54] APPARATUS FOR DETERMINATION OF DIFFUSION OF A PAIR OF SOLUTIONS INTO EACH OTHER
9 Claims, 4 Drawing Figs.
[52] U.S. Cl. .................................................. 356/246,
 23/292
[51] Int. Cl. .................................................. G01n 13/00
[50] Field of Search .......................................... 356/244,
 246; 250/218; 23/252, 254, 292

[56] References Cited
UNITED STATES PATENTS
2,810,315 10/1957 Miller.......................... 356/246

OTHER REFERENCES

Braude, E.A and Nachod F. G Determination of Organic Structures by Physical Methods. N.Y. Academic Press Inc., 1955 pages 55— 59

Daniels, F. and Alberty, R. A. Physical Chemistry N.Y., John Wiley & Sons Inc. 1966 pages 351—317

Primary Examiner—Ronald L. Wibert
Assistant Examiner—F. L. Evans
Attorney—Flynn and Frishuaf ABSTRACT: A pair of upright spaced parallel plates are held into a frame, to define a chamber therebetween which is in the shape of an upright parallelogram; inlet means for the heavier, and lighter liquids, respectively, are located at the lowest and highest points of the parallelogram, and a pair of overflow outlets are located in aligned horizontal position along the vertical upright lines of the parallelogram. The entire assembly can be incorporated together with a slide valve and pump combination, to admit the liquids whose diffusion constants are to be determined, to the respective inlets, and to open the outlet passages to a drain. The plates can be surrounded by a holder, for example of metal, formed with a slit to permit optical determination of diffusion.

Patented March 30, 1971

Inventor:
HANS BEUTELSPACHER
by Flynn & Frishauf
Attys

APPARATUS FOR DETERMINATION OF DIFFUSION OF A PAIR OF SOLUTIONS INTO EACH OTHER

The present invention relates to apparatus for the optical determination of diffusion rates of a pair of liquids, that is to determine the diffusion constants of a solute into a solvent.

Determination of the diffusion constants of solutes into predetermined solvents is one of the classical experiments of physical chemistry. Various types of apparatus have been proposed to determine the diffusion constant. Three principal groups of such apparatus are known, grouped in accordance with the way the interface between the solvent and the solute is obtained: (1) apparatus having a cell in which a layer of the solution of heavier specific gravity is formed with the solution of less specific gravity, the heavier material being in the bottom; (2) apparatus having a pair of relatively slidable cells, each one separate and containing the solvent and the solute, respectively, and moved by sliding into contact with each other; and (3) diffusion cells having a manual separating slider.

Determination of diffusion in liquids requires superimposition of solvent and solute in such a manner that, before the diffusion begins, a sharp interface is formed between the two substances. In a simple case, for example in the apparatus of group (1) above, a test tube, which may be a glass tube contains the substance of lower specific gravity. A capillary valve, or a frit interconnection from a supply of the solution of heavier specific gravity is connected to the bottom of the test tube to admit the solution, the interface between the two solutions slowly rising in the test tube. The test tube, that is the glass tube, is photographed from time to time and the distribution of concentration is obtained by photometry of the blackening of the photographic plate. Layering of solvent and solute requires comparatively long time, which may go to 45 minutes with substances of high molecular weight; even then, the interface may not be clearly defined.

Apparatus of the type (2) may use relative slidable blocks of a material such as glass, metals, or plastics, each having a rectangular cutout to accept solvent and solute, respectively. The diffusion chamber is closed off in the front and in the back by a pair of glass discs, pressed by springs or clips, or the like, against the blocks. After filling the chambers with solvent and solute, the blocks are slowly slid horizontally with respect to each other, until they are exactly in registration. Tests using organic solvent cause substantial difficulties in sealing the cells, since the liquids have a tendency to leak between the two blocks.

Apparatus of the type (3) uses test tubes separated by a slider; the lower half of the cell, formed by the test tube, is filled with solute, and solvent is then placed above the slider. The slider is then withdrawn slowly, for example at a speed of 1/20 to 1/10 mm./sec. Comparatively good interfaces can be obtained, however, the sealing necessary for the slider, such as greasy substances, oils, mercury or the like, may introduce contamination, interfering with optical determination.

The three groups above referred to all have the disadvantage that complete turbulence-free layering of solvent and solute cannot be ensured; an interface free from disturbances is however required in order to be able to determine when the diffusion starts.

It is an object of the present invention to provide apparatus to determine diffusion of a solute into a solvent which is so constructed that an interface free from disturbances is obtained, and which provides a high degree of reproducibility of the interface.

SUBJECT MATTER OF THE PRESENT INVENTION

Briefly, the diffusion chamber is formed of a pair of parallel glass or quartz glass plates, retained in a frame, the chamber formed between the glass plates and the frame having a parallelogram-shaped longitudinal cross section, with bores connected to the lowest and to the highest tips of the parallelogram. The heavier one of the two liquids is applied to the bottom tip and the lighter one to the highest tip. Approximately at half height of the parallelogram, and aligned at opposite sides of the frame, are a pair of bores to drain diffusion liquid. The inclined top cover of the diffusion chamber prevents the formation of air bubbles which might influence laminar flow of the diffusion liquid. The likewise inclined bottom of the diffusion chamber provides for slow and complete filling and formation of an interface between the liquids, without inclusion of the lighter liquid in the heavier, which might disturb the experiment and cause dilution during filling and prior to observation.

The frame may likewise be made of glass or quartz glass; its thickness defines the width of the interface. The frame is closed off at its front and back side by optically plane cover plates formed of glass or quartz glass, by cementing, melting, or mechanical sealing (such as screw connections), or, for example, by means of spring pressure.

In accordance with a feature of the invention, the instrument is combined with a valve arrangement, located on the right and left sides of the diffusion chamber and including a slide valve using a valve block. Polytetrafluoroethylene is a particularly suitable material for the slide valve parts. The slide valves themselves may not only open and close ducts to supply solute and solvent, but may additionally be formed with supply chambers for the liquids.

The invention will be described by way of example with reference to the accompanying drawings, wherein.

Figure 1:
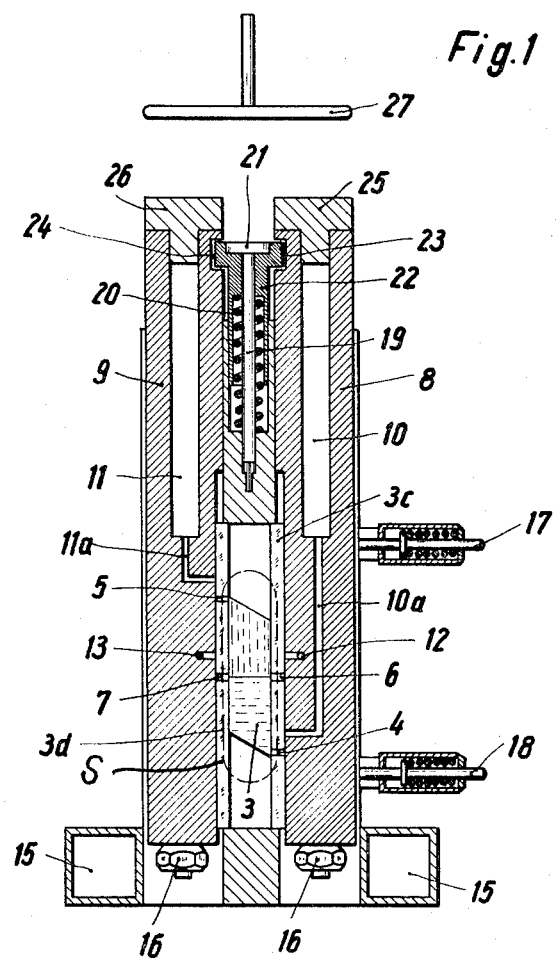
FIG. 1 is a longitudinal sectional view of the diffusion chamber arrangement, combined with valves, with the valves in closed position.
Figure 2:
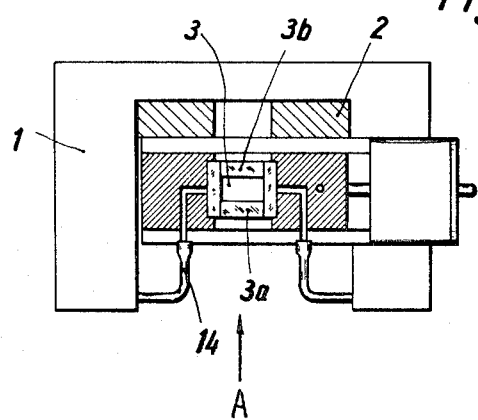
FIG. 2 is a transverse cross-sectional view of the arrangement of FIG. 1.

FIGS. 1 and 2 illustrate a support block 1, secured vertically upright and having a longitudinal slit (indicated in dashed lines S in FIGS. 1 and 3) to permit a beam of light, or other optical observation, to pass through the measuring cell in the direction of arrow A in FIG. 2. The diffusion apparatus 2, itself, is thus held in vertical position. Chamber 3, formed in the diffusion cell is defined by a frame of glass, or quartz glass, closed off at the front and back side by means of glass, or quartz glass plates 3a, 3b, and sealed thereto. The longitudinal cross section of diffusion chamber 3 is parallelogram-shaped, as clearly appears from FIGS. 1 and 3. The lowest tip point of the diffusion chamber terminates in bore 4 in order to supply thereto the liquid having the higher specific gravity; the highest tip point of the parallelogram connects with a bore 5 in order to apply thereto the lighter diffusion liquid. The two side surfaces 3c, 3d of the frame are formed with bores 6, 7 aligned horizontally and located approximately halfway between the top and bottom tip points of the parallelogram. Bores 6, 7, preferably have a smaller cross section than bores 4 and 5.

The diffusion cell is placed in block 1 in such a manner that the slit S can pass optical beams through the cell. To supply diffusion liquid, that is solute and solvent, and to separate the bores from continued supply of fluid, the pair of slide valves 8, 9 are located adjacent the cell itself. The slide valves are preferably formed as blocks of polytetrafluoroethylene, formed with chambers 10, 11, for the liquids, which communicate with connecting ducts 10a, 11a. Each slide valve is further provided with a drain duct 12, 13, connecting with tubing 14 to a sump 15 to receive excess diffusion liquid. Each slide valve 8, 9, has an adjustment screw 16 located at the bottom, with which the extent of depression of the slide valve with respect to the diffusion chamber itself (compare positioning of ducts 11a, bore 5; 10a, bore 4; and ducts 13, 12, bores 7, 6 in FIGS. 1 and 3) can be adjusted. Lock nuts are preferably provided to maintain the adjustment. Both valve blocks 8, 9, are guided in tracks formed in frame 1 (not separately shown). A pair of forked spring clips 17, 18 (FIGS. 1, 3) and shown schematically only, connect the valve blocks 8, 9 with the diffusion cell itself. Interconnection of the various elements of the assembly, that is the valve blocks, and the cells, and leakage-proof connection of the diffusion chamber itself as well as sealing of the supply and drainage ducts can readily be effected thereby. A metal pin 19 is located in the upper part of block 1, supplied with a compression spring 20, which bears against the inner part of a head 22 and a bore formed in the block. Head 22 fits into notches or grooves 23, 24 formed in the upper part of the valve blocks 8, 9. The pin 19 is formed with a head 21. In the measuring position (FIG. 1), the spring lifts the slide valve blocks 8, 9, thus interrupting communication between ducts 11a, bore 5, for example. By pressing on the end caps 25, 26 of the valve blocks 8, 9, for example by means of a plate 27, the valve blocks will slide downwardly against the compression of spring 20 and establish communication between bores 4, 5, for the supply of diffusion liquid from the chambers 10, 11, into the diffusion chamber 3. Additionally, connection is established between bores 6, 7, and the drain to permit drainage of excess diffusion liquid, so that in the position of FIG. 3 the diffusion cell will have a sharply defined interface between the liquids.

The arrangement as illustrated is preferably located inside a thermostatically controlled enclosure, not shown in the drawings for purposes of clarity.

Figure 3:
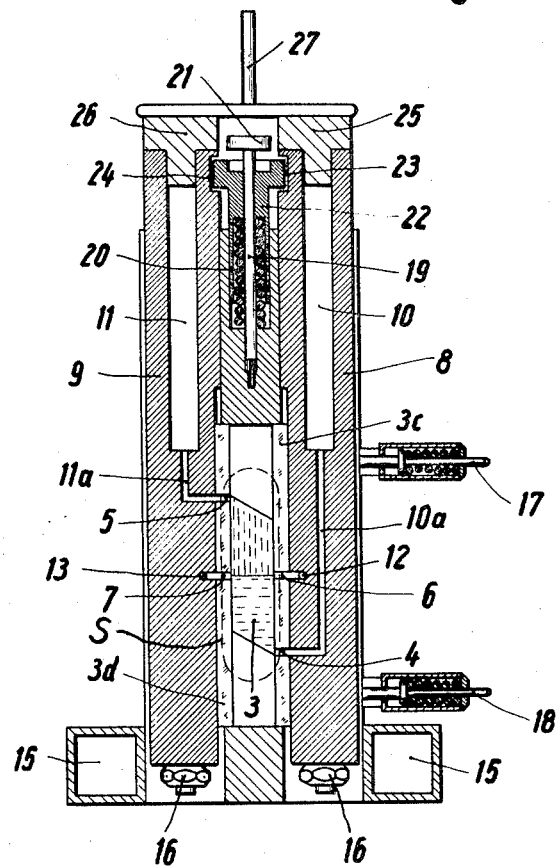
FIG. 3 is a view similar to FIG. 1, with the valve open.
Figure 4:
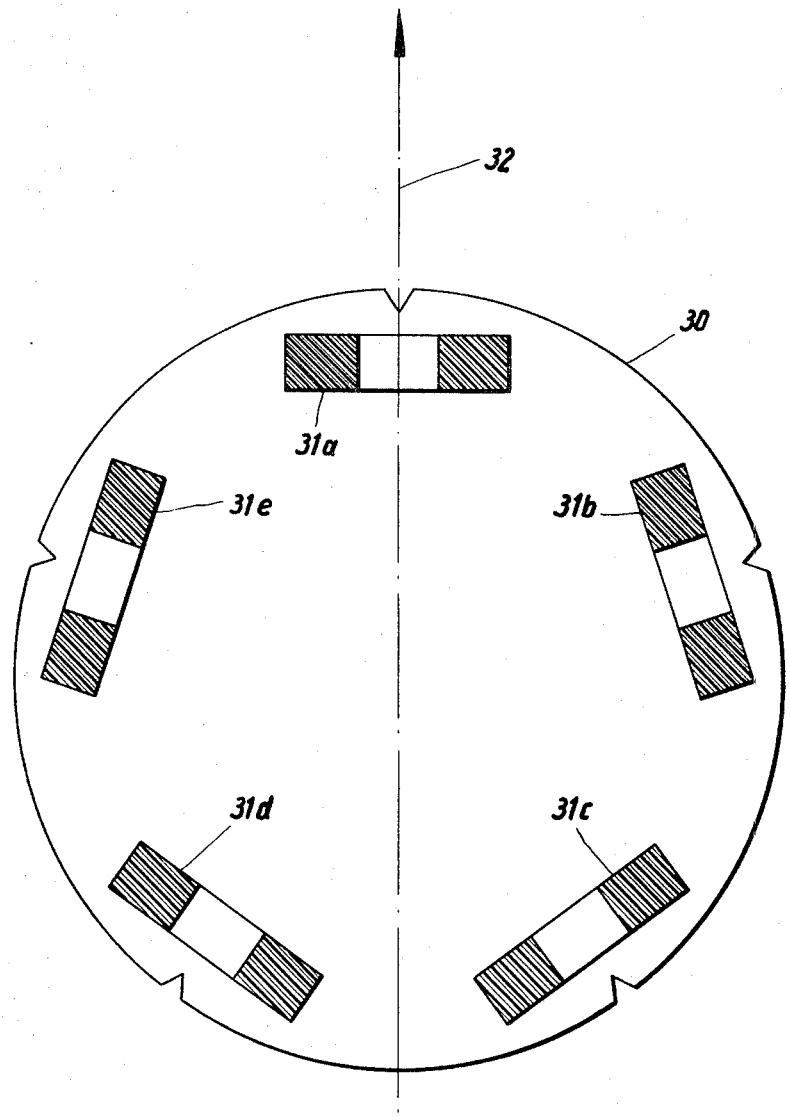
FIG. 4 is a schematic arrangement of a plurality of diffusion measuring cells on a turntable.

FIG. 4 illustrates an assembly of arrangements in accordance with FIGS. 1 to 3, located on a rotating turntable 30; as an example, five assemblies 31a—31e to determine diffusion of a solute in a solvent are placed on turntable 33. Any known mechanical rotation, or indexing apparatus, for example operating with notches formed in the periphery of disc 30, can bring a selected cell in position to be optically examined by a beam 32, without interference from the other cells 31b—31e. This has the advantage that a plurality of solutions may be tested under comparable temperature conditions, or, similar solutions of different concentrations can be simultaneously examined under approximately equal conditions. Additionally, five diffusion coefficient measuring points can readily be obtained in short periods of time, from which the diffusion constants can then be graphically determined.

The diffusion arrangement in accordance with the present invention can be preferably utilized with analytic centrifuges. To determine molecular weight of high molecular substances by means of analytic ultracentrifuge, sedimentation of macromolecules is influenced substantially by counteracting diffusion. Thus, simultaneous determination of diffusion constants, besides sedimentation constants is necessary to calculate particle weight.

I claim:

1. Apparatus for optical determination of diffusion of a pair of solutions in each other comprising:
   a pair of parallel transparent plates (3a, 3b), and frame means (3c, 3d) holding said plates from each other and defining a diffusion chamber (3) therebetween, said chamber having a cross section formed essentially in the shape of an upright parallelogram;
   inlet means (4) at the lowest point of said chamber to admit a solution of a specific gravity;
   inlet means (5) at the highest point of said chamber to admit a solution of a lesser specific gravity than the solution to be admitted to the inlet means (4) at the lowest point;
   horizontally aligned openings (6, 7) formed in opposite longitudinal sides of the frame means approximately intermediate between said highest and lowest point of the parallelogram to drain excess solution; and
   means communicating with said inlet means and said openings to conduct liquid into and out of said chamber.

2. Apparatus according to claim 1, including a pair of slide valves (8, 9) each located adjacent a side frame defining the diffusion chamber, first fluid communication means (10a, 11a) interconnecting a respective slide valve and a respective inlet means to said chamber; and second fluid communication means (12, 13) interconnecting said horizontally aligned openings (6, 7) to a drain.

3. Apparatus according to claim 2, wherein each slide valve has an enlarged chamber (10, 11) to retain a respective solution.

4. Apparatus according to claim 3, including a sump (15) interconnected (14) with respective second fluid communication means to collect excess solution.

5. Apparatus according to claim 2, wherein said slide valves are formed in blocks resiliently and separably secured (17, 18) at alternate sides to the frame means and leaving said plates (3a, 3b) unobstructed.

6. Apparatus according to claim 2, including adjustment means (16) located at the lower end of said slide valves to adjust the stroke thereof.

7. Apparatus according to claim 1, including a vertical metal plate located adjacent said transparent plates and formed with a slit (S) permitting passage of light through said plates; said apparatus further including a pair of slide valve blocks (8, 9) each located adjacent a side frame of said diffusion chamber, and slide grooves formed in said valve blocks permitting sliding of said blocks with respect to said plates.

8. Apparatus for determination of diffusion rates comprising a rotatable turntable (30) and a plurality of optical apparatus assemblies, each in accordance with claim 1, mounted on said turntable.

9. Apparatus according to claim 1, including a holder for said plates and frame means, said holder comprising an upstanding plate (2); a base frame surrounding said frame means and said plate, said plate being formed with a slit to permit passage of light through said plates; a pair of valve blocks (8, 9) slidable conjointly in said upstanding plate, each said valve blocks having a fluid reservoir chamber (10, 11), fluid communication means connecting said reservoir chambers with respective inlet means, and fluid communication means connecting said horizontally aligned openings with a drain, when said valve blocks are in a depressed position on said slide by aligning said inlet means and said aligned openings with said fluid communication means in said valve blocks.